(12) United States Patent
Agarwal et al.

(10) Patent No.: US 11,909,607 B1
(45) Date of Patent: Feb. 20, 2024

(54) MAINTAINING CONSISTENT MEASUREMENT INTERVALS OF MEF 35.1 PERFORMANCE MONITORING (PM) SESSIONS IN A HISTORY DATABASE

(71) Applicant: Ciena Corporation, Hanover, MD (US)

(72) Inventors: Shivam Agarwal, Allahabad (IN); Aditya Yadav, Alwar (IN); Jai Kumar, Rohtak (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/951,236

(22) Filed: Sep. 23, 2022

(30) Foreign Application Priority Data

Aug. 6, 2022 (IN) .............................. 202211045016

(51) Int. Cl.
*H04L 43/04* (2022.01)
*H04L 43/067* (2022.01)
*H04L 43/028* (2022.01)
*H04L 43/0811* (2022.01)

(52) U.S. Cl.
CPC ............ *H04L 43/028* (2013.01); *H04L 43/04* (2013.01); *H04L 43/067* (2013.01); *H04L 43/0811* (2013.01)

(58) Field of Classification Search
CPC .............................. H04L 43/04; H04L 43/067
See application file for complete search history.

(56) References Cited

U.S. PATENT DOCUMENTS

| | | |
|---|---|---|
| 9,807,022 B2 | 10/2017 | Agarwal |
| 9,838,320 B2 | 12/2017 | Agarwal |
| 10,015,101 B2 | 7/2018 | Agarwal et al. |
| 10,171,358 B2 | 1/2019 | Saksena et al. |

(Continued)

FOREIGN PATENT DOCUMENTS

WO     WO-2015117266 A1 *   8/2015   ............ H04W 24/10

OTHER PUBLICATIONS

MEF, MEF 35.1, "Service OAM Performance Monitoring Implementation Agreement," May 2015, pp. 1-160.

(Continued)

*Primary Examiner* — Johnny B Aguiar
(74) *Attorney, Agent, or Firm* — Baratta Law PLLC; Lawrence A. Baratta, Jr.

(57) ABSTRACT

Systems and methods are provided for addressing issues caused by interruptions that may occur while operating under the Metro Ethernet Forum (MEF) 35.1 standard. A method, according to one implementation, includes obtaining PM data during a current Measurement Interval of an ongoing PM session in accordance with MEF 35.1. The PM data can be locally stored as a current dataset and reported at the end of the current Measurement Interval for storage in a history database. Following an interruption event that interrupts at least the current Measurement Interval, the method detects a recommencement event that clears the interruption event and allows a PM session to resume. The method further includes determining a number of Measurement Intervals affected by the interruption event based on an end time of a last-reported Measurement Interval and then inserting the number of affected Measurement Intervals into the history database after the last-reported Measurement Interval.

14 Claims, 6 Drawing Sheets

(56) References Cited

U.S. PATENT DOCUMENTS

| | | | |
|---|---|---|---|
| 2008/0002576 A1* | 1/2008 | Bugenhagen | H04L 67/1012 370/229 |
| 2016/0156540 A1* | 6/2016 | Hu | H04L 43/16 370/241.1 |
| 2017/0134282 A1 | 5/2017 | Agarwal et al. | |

OTHER PUBLICATIONS

ITU-T, Telecommunication Standardization Sector of ITU, G.8013/Y.1731, "Operation, administration and maintenance (OAM) functions and mechanisms for Ethernet-based networks," Aug. 2015, pp. 1-102.

\* cited by examiner

MAINTAINING CONSISTENT MEASUREMENT INTERVALS OF MEF 35.1 PERFORMANCE MONITORING (PM) SESSIONS IN A HISTORY DATABASE

TECHNICAL FIELD

The present disclosure generally relates to networking systems and methods. More particularly, the present disclosure relates to handling Performance Monitoring (PM) data according to MEF 35.1 PM sessions and storing the PM data so as to maintain consistent Measurement Intervals throughout a history database.

BACKGROUND

With respect to optical communication networks and network domains, Operations, Administration, and Maintenance (OAM) and Service OAM (SOAM) protocols are defined in various standards, such as ITU-T Y.1731 provided by the International Telecommunication Union (ITU) and MEF 35.1 provided by the Metro Ethernet Forum (MEF). In some respects, MEF 35.1 may be considered to be a superset of ITU-T Y.1731. An advantage of MEF 35.1 over the ITU standard is that MEF defines more control aspects and more description of the handling of history data.

In short, the goal of MEF 35.1 is to define specific performance measurement procedures, such as the collection and storage of these performance measurements. Performance Monitoring (PM) data is obtained from a network component and can be used for informational purposes or for computing certain metrics related to the communications network. A PM session may refer to obtaining PM data between a given pair of Maintenance association End Point (MEP) devices over a given period of time or indefinitely in the case of request for a "proactive" session. A Network Element (NE) may be responsible for conducting PM measurements, while a Network Management System (NMS) may be responsible for configuring, collecting, and processing PM data to determine one or more performance metrics for a Maintenance Entity Group (MEG).

For the duration of a PM session in MEF 35.1, measurements are partitioned into fixed-length "Measurement Intervals." The length of time associated with each Measurement Interval is called the "duration." The duration of the Measurement Interval defines the amount of time over which the statistics are collected and stored separately from statistics of other Measurement Intervals. Also, the start of each Measurement Interval is defined by an "offset," which is the delay after the top of each hour of a time-of-day clock. The results of the measurements are captured in a local dataset and are stored as separate Measurement Intervals. For example, if the duration of the Measurement Interval is set to 15 minutes and the offset is set to 5 minutes, the Measurement Intervals would start at 5, 20, 35, 50 minutes past each hour, for every hour as long as the PM session is configured to run.

In addition to Measurement Intervals, other attributes of MEF 35.1 PM sessions include the Message Period, Repetition Period, Start Time, and Stop Time (which may be indefinite). Protocol Data Units (PDUs) associated with the PM session are transmitted every "Message Period," which might correspond to the end of each Measurement Interval. The PM data may be collected during a Measurement Interval (e.g., about 10 or 15 minutes) and stored in a current dataset. When time progresses past the Measurement Interval, the former current dataset is identified as a history dataset. There may be multiple history datasets (e.g., about 96), and the oldest may be overwritten using a wrapping memory strategy.

Typically, the MEF 35.1 standard is applicable to a single network component, such as a "pizza box" component, which may include one single unit all arranged on the same module. However, MEF 35.1 may not be practical in a multi-card chassis-based system, which may include multiple pizza boxes or other components. When a pizza box reboots, for example, all the information from the PM session (e.g., history data) is all wiped out and the PM session will restart recording information again with Measurement Interval #1. In this case, there will be no record of previous information.

It should be noted that this issue is not addressed in the MEF 35.1 standard or in other literature. Therefore, there is a need to provide an extension to MEF 35.1 to handle a multi-card chassis-based system that is capable of storing PM data and enabling this data to be accessed, even when there is a reboot or other interruption.

When PM sessions are configured on Multi-Rate Optical (MRO) cards and Data Primary (DP) cards are rebooted, there is no continuity with regard to previously stored Measurement Intervals. Also, there is no alignment with the previous Measurement Intervals that would correlate new Measurement Intervals with past Measurement Intervals having a correct index. Thus, there is a need to provide improvements to the OAM standards regarding PM collection and handling, particularly in chassis-based products to allow alignment during a reboot or switchover event.

BRIEF SUMMARY

The present disclosure is related to systems and methods for maintaining the consistency of Measurement Intervals, which are defined in accordance with MEF 35.1, even when an interruption occurs during a service. In one implementations, a process is provided for inserting a number of Measurement Intervals within a history database to maintain continuous and consistent records in the history database. The process includes the step of obtaining PM data during a current Measurement Interval of an ongoing PM session in accordance with the MEF 35.1 standard. The PM data, for example, is configured to be locally stored as a current dataset to be reported at the end of the current Measurement Interval and stored in a history database. Following an interruption event that interrupts at least the current Measurement Interval, the process includes the step of detecting a recommencement event that clears the interruption event and allows a PM session to resume. Also, the process includes the step of determining a number of Measurement Intervals affected by the interruption event based on an end time of a last-reported Measurement Interval. Furthermore, the process includes the step of inserting the number of affected Measurement Intervals into the history database after the last-reported Measurement Interval.

According to various embodiments, the process may be performed by a Network Management System (NMS), which may be configured to use the history database, or may be performed by one or more Network Elements or monitoring devices, which may be configured to use the history database. In some embodiments, the process may be configured as software and/or firmware and may be stored in a non-transitory computer-readable medium. When implemented in software and/or firmware, the process may include logic or computer instructions enabling a processing device to perform the steps described above.

In some additional embodiments, the process may include aligning the start of a next whole Measurement Interval of the ongoing PM session with the end of the last affected Measurement Interval inserted into the history database. The step of inserting the number of affected Measurement Intervals into the history database may be configured to provide continuous and consistent Measurement Intervals in the history database to thereby maintain the same duration and offset applied to Measurement Intervals before the interruption event. Each of the Measurement Intervals described in process may include PM data obtained during a predetermined time period, wherein an end time of one Measurement Interval aligns with a start time of a subsequent Measurement Interval to eliminate gaps in the history database.

The step of inserting the number of affected Measurement Intervals into the history database may be performed in lieu of resetting the PM session, according to some embodiments. The process may further include the step of setting a suspect flag associated with each of the inserted Measurement Intervals. The interruption event and recommencement event, for example, may be associated with a) a reboot procedure of a Line Module (LM) card, b) a reboot procedure of a Multi-Rate Optical (MRO) card, c) a reboot procedure of a Data Primary (DP) card, d) a reboot procedure of a Cross Connect (XC) card, or e) a switchover procedure from one control module to another. Each of the reboot procedures may be either a cold reboot, in which the corresponding card is replaced with another similar card, or a warm reboot, in which the interruption event is related to the corresponding card operationally going down and the recommencement event is related to the corresponding card operationally coming back up again.

In some cases, the PM data may be obtained between a pair of NEs arranged in a network domain. The NE may be a chassis-based Maintenance-association End Point (MEP) at an edge of the network domain or a Network Management System that monitors one or more chassis-based MEPs at the edge of the network domain. The PM data may be related to Connectivity Fault Management (CFM) data. The process may further include the step of applying an index number to each of the inserted Measurement Intervals to continue a sequence of index numbers from the last-reported Measurement Interval.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
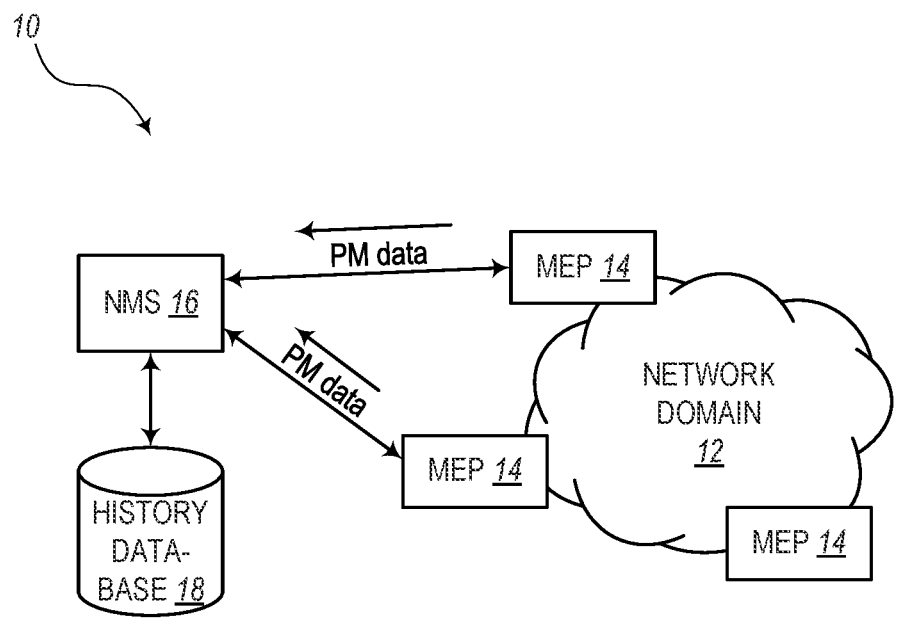
FIG. 1 is a diagram illustrating a system for measuring and reporting Performance Monitoring (PM) data, according to various embodiments.

FIG. 1 is a diagram illustrating an embodiment of a system 10 for measuring and reporting Performance Monitoring (PM) data, where the system 10 enables Operations, Administration, and Maintenance (OAM) or Service OAM (SOAM) functionality. For example, the system 10 may be configured to conduct Performance Monitoring (PM) of Network Elements (NEs) of a network domain 12. For example, the network domain 12 may include photonic and/or Ethernet components. The network domain 12 may be a cloud network, sub-network, OAM domain, maintenance association, or the like.

A plurality of Maintenance association End Point (MEP) devices 14 may be arranged at an edge of the network domain 12, whereby each MEP device 14 may be configured to measure PM data, such as information that can be used to determine frame loss and frame delay or can be used for Service Level Agreement (SLA) activities, capacity planning, fault detection and notification, continuity checks, loopbacks, link traces, and the like. The MEP device 14 may be configured as network nodes, optical data packet device, NEs, etc. In some cases, the PM data may be related to end-to-end measurements that are measured between two NEs or MEP devices 14.

According to some embodiments, the MEP devices 14 may be configured to process or analyze the PM data and then, in response to the PM data, may further perform any suitable actions, such as remediation actions According to other embodiments, the MEP devices 14 may be configured to pass the PM data to a Network Management System (NMS) 16 (e.g., central office, OAM controller, etc.). The NMS 16 may be configured to store the PM data in a history database 18 and process the PM data to determine frame loss, frame delay, etc. In some embodiments, the history database 18 may be configured to store the PM data in any type of memory device (e.g., persistent memory, First-In First-Out (FIFO) memory, etc.). When configured as FIFO memory, the history database 18, according to MEF 35.1, may be configured to store 96 Measurement Intervals (e.g., iterations, indices, etc.) and old data is re-written with new data. Thus, the NMS 16 may be configured to store about 960 minutes' worth of PM data before the oldest data is lost and therefore should use the PM data in a timely manner as needed.

The MEF 35.1 standard related to PM sessions, where PM data is obtained over multiple "Measurement Intervals" and reported to an NMS (e.g., NMS 16 or the like) for processing. However, as mentioned above, MEF 35.1 does not address how PM data is maintained in a history database when there is a single-component device (e.g., pizza box) reboots or when a chassis-based system (e.g., having multiple network components) includes at least one card that reboots or is being replaced and/or when a Control Module (CM) of the chassis-based system goes through a switchover process.

In a PM session, the MEP devices 14 may be configured to measure PM parameters, collect these PM parameters in local memory, and then report a group of these PM parameters (e.g., in the form of a Measurement Interval) to the NMS 16 at the end of each measurement period or Measurement Interval. The NMS 16 may be configured to store the Measurement Interval PM data in a history database 18, which can be accessed as needed for processing and detection of certain network metrics.

Figure 2:
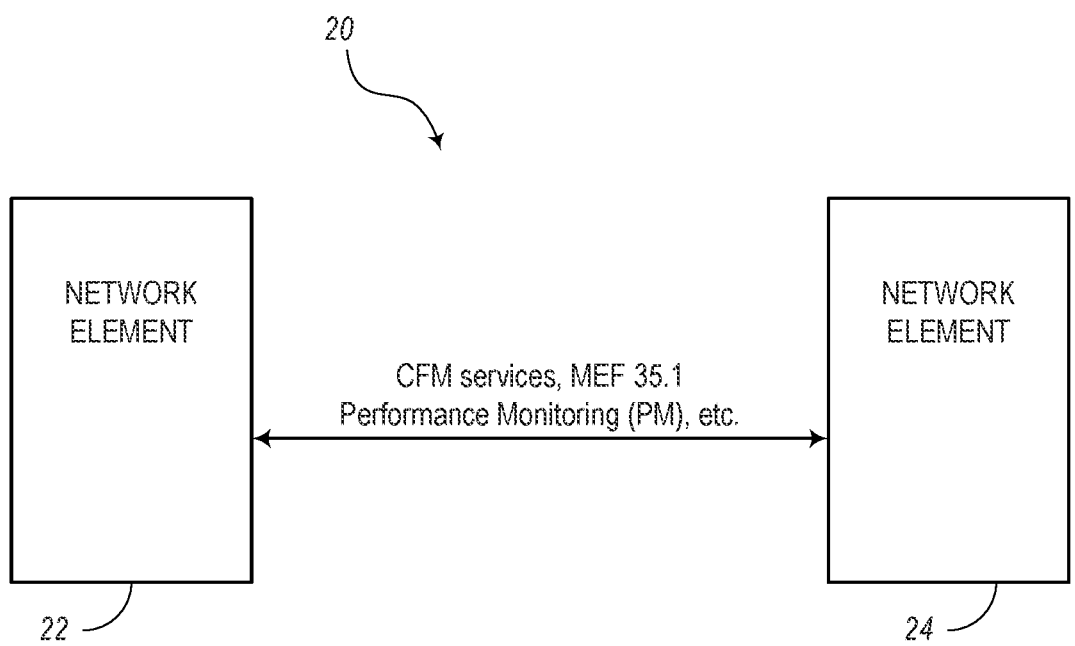
FIG. 2 is a block diagram illustrating a PM session configured between two Network Elements (NEs), according to various embodiments.

FIG. 2 is a block diagram illustrating an example of a PM session 20 configured between two NEs 22, 24. The NEs 22, 24 may be used for performing Connectivity Fault Management (CFM) functions according to IEEE 802.1ag. Also, the NEs 22, 24 may be used for PM functions according to MEF 35.1 or other activities.

In a network (e.g., network domain 12) where PM data is obtained between a pair of NEs 22, 24, PM data may be handled according to the MEF 35.1 standard. However, as described in the present disclosure, issues that are not addressed in the standard are dealt with in a way that allows the records stored in the history database 18 to maintain consistent and continuous Measurement Intervals throughout an ongoing PM session or across two consecutive PM sessions.

During an ongoing PM session in accordance with MEF 35.1, the PM session is configured to include sequential Measurement Intervals. Also, each Measurement Interval includes PM data that is obtained within a specific time duration, which can be preset by an operator. For example, the time duration may be on the order of about 10 minutes and may range from one minute to 15 minutes. At the end of each of these specific time durations of each Measurement Interval, the PM data is reported to a recordation system, control device, NMS 16, or the like. Then, the NMS 16 (or the like) can record the PM data in the history database 18.

However, as mentioned above, the MEF 35.1 standard does not address the issue of handling PM sessions when an interruption event occurs. An example of various types of interruption events, as applicable in the present disclosure, may include a Line Module (LM) card reboot, a Data Primary (DP) card reboot, a Cross Connect (XC) card reboot, or a reboot of other suitable types of cards that may be installed in the NEs 22, 24. In addition, other examples of types of interruption events may include switchover events, such as switching from one LM card, Multi-Rate Optical (MRO) card, DP card, or XC card over to another LM, MRO, DP, XC card and/or switching from one Control Module (CM) (of an NE) over to another. In the cases of rebooting events or switchover events, the LM cards, MRO cards, DP cards, XC cards, CMs, etc. may be down (operationally) for a number of minutes (e.g., about 20 minutes) and then may restart (or may be replaced with a similar device) after a certain delay (e.g., about 20 minutes). Thus, in either case, these interruption events normally cause the Measurement Intervals, according to MEF 35.1, to reset in an inconsistent manner, which can cause the history database 18 to store the PM data within unpredictable Measurement Intervals.

In some embodiments, when an interruption event is detected that would normally reset the PM session, the systems and methods of the present disclosure are configured to wait for a "recommencement event" or resumption event that clears the interruption event. For example, the recommencement event may be the restarting operation of a device (e.g., LM card) that is rebooted or the operationally functioning start of a replacement device (e.g., CM) that replacing another similar device during a switchover event. In some embodiments, the ongoing PM session may continue as before and resume its previous activities. In other embodiments, the initial PM session may stop at the interruption event and the PM session may restart at the recommencement event.

With respect to the way in which the PM data is stored in the history database 18, the systems and methods of the present disclosure may be configured to align resumptive Measurement Intervals with the previously recorded Measurement Intervals. This may be accomplished in any number of reasonable ways. For example, in one case, when the recommencement event or resumption event is detected, the number of one or more Measurement Intervals that were affected by the interruption event can be calculated. This number of Measurement Intervals can then be added after the last reported Measurement Intervals to continue in a consistent manner with respect to the initial PM session. As such, the PM data in the history database can be recorded more consistent manner.

According to some additional embodiments, the added Measurement Intervals, which are inserted in the record, can be aligned with the previous reported Measurement Intervals so that there would be no gap in the data history. For example, the first added Measurement Interval may start at the end of the last reported Measurement Interval (i.e., assuming that the "repetition time" in MEF 35.1 is set to "none," whereby Measurement Intervals are aligned sequentially or back-to-back).

Since the first and last Measurement Intervals may initially be considered to be partial intervals and the PM data may not be reliable, the systems and methods of the present may further include marking the added Measurement Intervals as "suspect," or setting the "suspect flag" as defined in MEF 35.1.

Again, the interruption event may be the start of a reboot procedure for an LM card, MRO card, DP card, or XC card and/or the start of a switchover procedure away from an initial CM. The recommencement or resumption event may be the end of the reboot or switchover procedure where a card restarts its operation or operational functionality is switched over to the new CM. The reboot procedure may be a cold reboot in which the LM card or DP card is replaced with another LM card or DP card or a warm reboot in which the LM card or DP card goes down and is restarted.

The NEs 22, 24 may be chassis-based MEP devices 14 at the edge of the network domain 12. The NMS 16 is configured to monitor the one or more chassis-based MEP devices 14 based on the received PM data. The PM data may be related to Connectivity Fault Management (CFM) data.

The step of calculating the number of partial and full Measurement Intervals affected during the interruption event may include the step of determining a time between the last reported Measurement Interval and the time when the recommencement or resumption event was detected. Index numbers used for identifying the added Measurement Intervals may be continued sequentially from the last recorded Measurement Interval and the same Measurement Interval duration and offset can be maintained with respect to the duration and offset used before the interruption.

In some embodiments, the obtained PM data may be obtained with respect to Multi-Rate Optics (MRO) devices of the network domain 12. To arrange the history data such that the Measurement Intervals are stored back-to-back, whereby the start of a next Measurement Interval coincides with the end of a previous Measurement Interval. For example, in MEF 35.1, to record the Measurement Intervals back-to-back, the "repetition time" will be set to "none" instead of providing a value indicating the start times separating one Measurement Interval from the next.

In some embodiments, an ongoing PM session (having one or more Measurement Intervals) may continue through and beyond the interruption. In other embodiments, the initial PM session may stop when the interruption event is detected and the PM session may restart when the recommencement event is detected. Even in the case of two PM sessions, the Measurement Intervals of the second PM session will be configured, according to the embodiments of the present disclosure, to align with the Measurement Intervals of the first PM session. Alignment, in this respect, refers to multiple Measurement Intervals maintaining consistency throughout the interruption. Also, the PM session may be restarted (or the second PM session may be started) with a truncated Measurement Interval at the start, followed by Measurement Intervals aligned with the Measurement Intervals of the previous PM session.

The cards (e.g., LM cards, MRO cards, DP cards, XC cards, etc.) may be inserted in a NE 22, 24, MEP device 14, optical data packet device, or other type of packet transport system. The NE 22, 24 (or other suitable device) may be chassis-based system and may be configured to include multiple cards, CMs, etc. The cards, for example, may be configured with their own chipsets for packet processing and may be dependent on XC cards or the host (e.g., NE 22, 24). When an XC LM reboots, an MRO card may remain UP and packets may be processed by other XC LM cards, which may be UP. Switchover may be used for redundancy purposes. For example, two CMs may be installed in the chassis of the NE 22, 24, where the switchover procedure may include that a current CM may be rebooted by switching to a standby CM that takes ownership.

Figure 3:
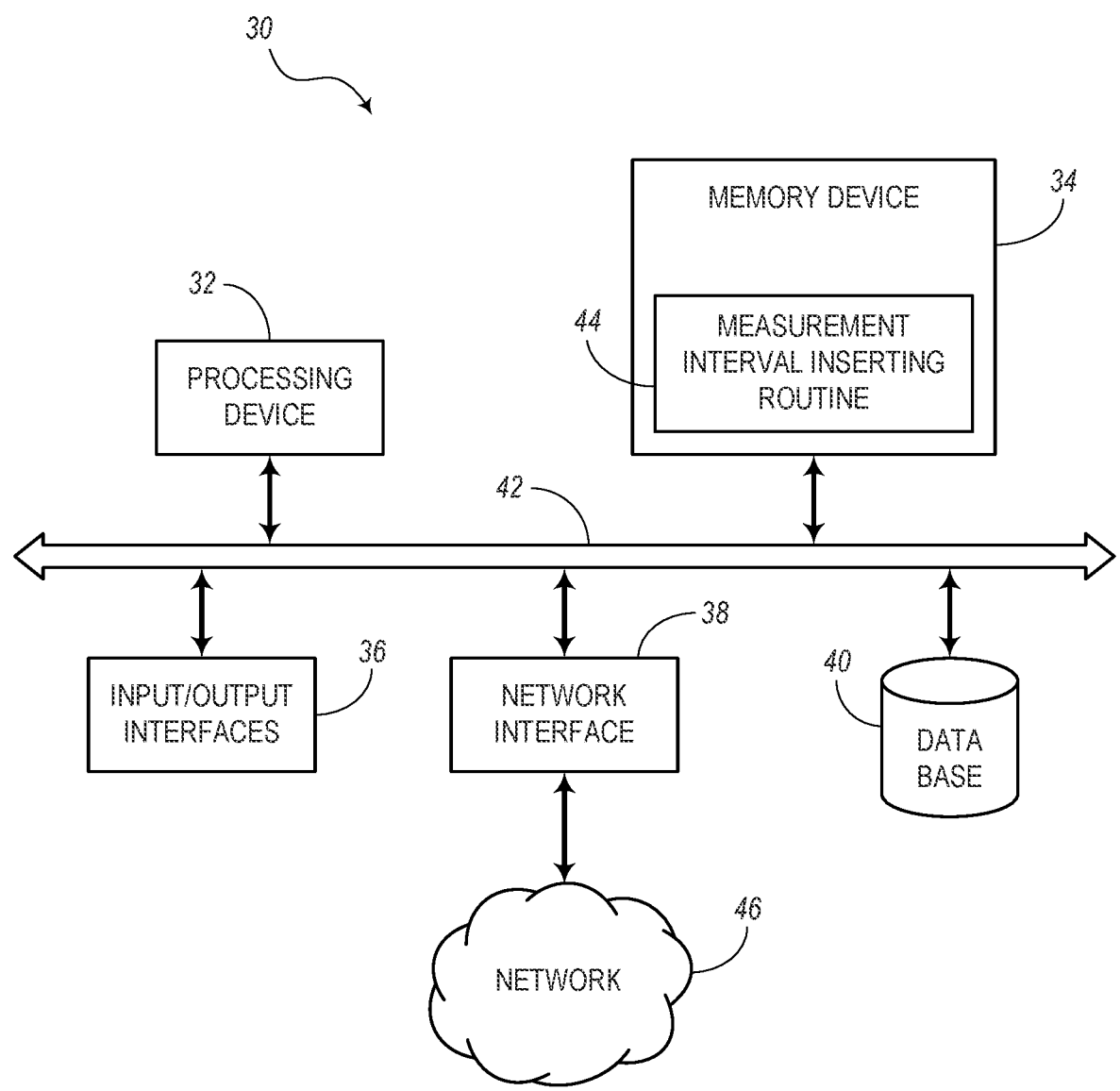
FIG. 3 is a block diagram illustrating the Network Management System (NMS) shown in FIG. 1 or one of the NEs shown in FIG. 2 for inserting Measurement Intervals affected by an interruption during a MEF 35.1 PM session, according to various embodiments.

FIG. 3 is a block diagram illustrating an embodiment of a monitoring device 30. For example, the monitoring device 30 may represent one of the MEP devices 14 or the NMS 16 shown in FIG. 1, one of the NEs 22, 24 shown in FIG. 2, a control device (e.g., controller in a control plane), or other suitable device or system for monitoring aspects of a network, sub-network, autonomous network, maintenance association, domain, network domain, or the like. In particular, the monitoring device 30 is configured to obtain PM data, which may include measuring parameters associated with the monitoring device 30 itself or receiving PM data from an external device. Upon obtaining the PM data, the monitoring device 30 is configured to insert Measurement Intervals within the records of a history database (e.g., history database 18, database 40, etc.), where the inserted Measurement Intervals are those that are affected by an interruption during a MEF 35.1 PM session.

In the illustrated embodiment, the monitoring device 30 may be a digital computing device that generally includes a processing device 32, a memory device 34, Input/Output (I/O) interfaces 36, a network interface 38, and a database 40. It should be appreciated that FIG. 3 depicts the monitoring device 30 in a simplified manner, where some embodiments may include additional components and suitably configured processing logic to support known or conventional operating features. The components (i.e., 32, 34, 36, 38, 40) may be communicatively coupled via a local interface 42. The local interface 42 may include, for example, one or more buses or other wired or wireless connections. The local interface 42 may also include controllers, buffers, caches, drivers, repeaters, receivers, among other elements, to enable communication. Further, the local interface 42 may include address, control, and/or data connections to enable appropriate communications among the components 32, 34, 36, 38, 40.

It should be appreciated that the processing device 32, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 32 may also include or utilize stored program instructions (e.g., stored in hardware, software, and/or firmware) for control of the monitoring device 30 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 34 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 34 may incorporate electronic, magnetic, optical, and/or other types of storage media. The memory device 34 may have a distributed architecture, where various components are situated remotely from one another, but can be accessed by the processing device 32.

The memory device 34 may include a data store, database (e.g., history database 18, database 40), or the like, for storing data. In one example, the data store may be located internal to the monitoring device 30 and may include, for example, an internal hard drive connected to the local interface 42 in the monitoring device 30. Additionally, in another embodiment, the data store may be located external to the monitoring device 30 and may include, for example, an external hard drive connected to the Input/Output (I/O) interfaces 36 (e.g., SCSI or USB connection). In a further embodiment, the data store may be connected to the monitoring device 30 through a network and may include, for example, a network attached file server.

Software stored in the memory device 34 may include one or more programs, each of which may include an ordered listing of executable instructions for implementing logical functions. The software in the memory device 34 may also include a suitable Operating System (O/S) and one or more computer programs. The 0/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 32), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 32 or other suitable circuitry or logic). For example, when executed, the instructions may cause or enable the processing device 32 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 32), or any suitable combination thereof. Software/firmware modules may reside in the memory device 34, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 36 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 36 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 38 may be used to enable the monitoring device 30 to communicate over a network, such as the network domain 12, the network 46, the Internet, a Wide Area Network (WAN), a Local Area Network (LAN), and the like. The network interface 38 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 38 may include address, control, and/or data connections to enable appropriate communications on the network domain 12, network 46.

The monitoring device 30 further includes a Measurement Interval Inserting Routine 44, which may be configured in any suitable combination of software that is stored in the memory device 34 and/or hardware that is configured in the processing device 32. The Measurement Interval Inserting Routine 44 may include computer logic or instructions that are configured to enable or cause the processing device 32 to perform certain functions or activities. In particular, the Measurement Interval Inserting Routine 44 may be an extension of MEF 35.1 standard (or other similar OAM PM standard) and may be configured to provide features that go beyond what is currently defined in the standard.

As described in the present disclosure, the Measurement Interval Inserting Routine 44 may enable the processing device 32 to obtain Performance Monitoring (PM) data during a current Measurement Interval of an ongoing PM session in accordance with the MEF 35.1 standard. The processing device 32 is configured to store the PM data as a current dataset in local memory during the current Measurement Interval. Then, when the current Measurement Interval ends, the processing device 32 is configured to report the PM data obtained during the Measurement Interval to a history database, which may be internal to the monitoring device 30 or may be an external device accessed via the network interface 38. Following an interruption event that interrupts at least the current Measurement Interval, the Measurement Interval Inserting Routine 44 enables the processing device 32 to wait for and detect a recommencement event that clears the interruption event and allows the PM session to resume. When the recommencement event is detected, the processing device 32 calculates a number of Measurement Intervals affected by the interruption event. This calculation, for example, may be based on an end time of a last-reported Measurement Interval and may include the time when the recommencement event is detected. Then, the processing device 32 is configured to insert the number of affected Measurement Intervals into the history database after the last-reported Measurement Interval.

Figure 4:
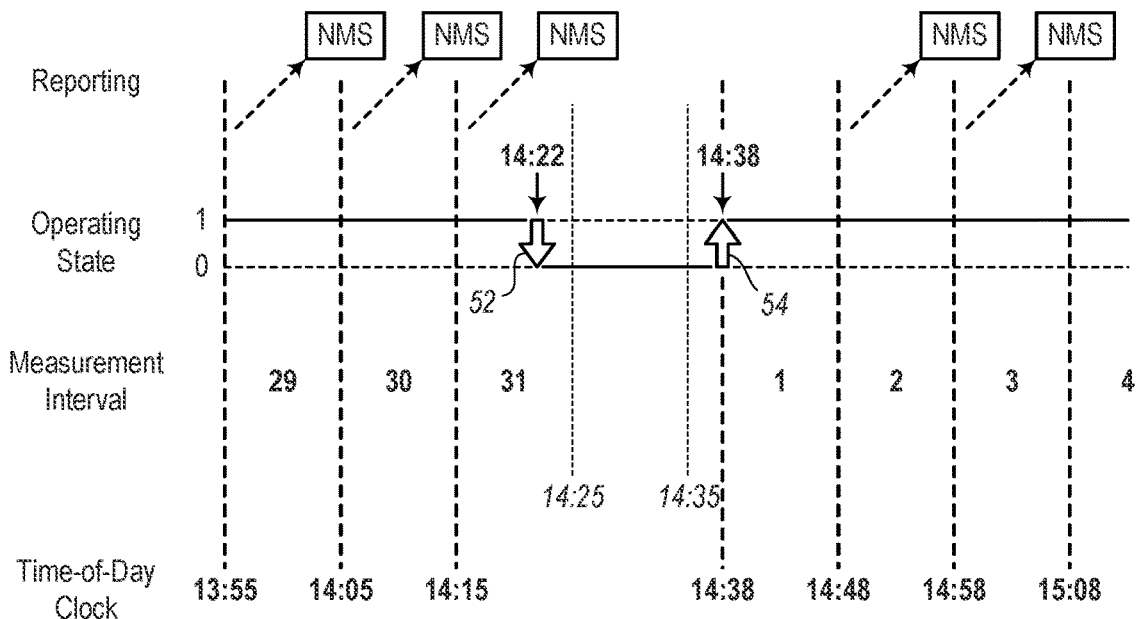
FIG. 4 is a chart illustrating an example of an effect of an interruption event on the Measurement Intervals during a MEF 35.1 PM session.

FIG. 4 is a chart illustrating an example of an effect of an interruption event on the Measurement Intervals during a MEF 35.1 PM session. It should be noted that the MEF 35.1 standard does not address what happens when there is an interruption event. However, based on observations, it can be seen that certain actions will be taken in response to an interruption that will cause additional Measurement Intervals to be stored in a manner that is inconsistent with previous Measurement Intervals before the interruption event. In some respect, therefore, FIG. 4 may represent the issue that may result from an interruption without the assistance of Measurement Interval insertion strategies as described in the present disclosure and which are described in more detail below (e.g., with respect to FIG. 5).

In the example of FIG. 4, the "duration" of each Measurement Interval is set to 10 minutes and the "offset" (with respect to the top of each hour) is set to five minutes. Thus, Measurement Intervals will start at 5, 15, 25, 35, 45, and 55 after the hour and extend for 10 minutes each. Also, it may be assumed in this example that the repetition time is set to "none," which simply seems that the Measurement Intervals are configured to extend back-to-back where one Measurement Interval starts at the same time that the previous Measurement Interval ends.

As shown in the example of FIG. 4, a PM session has been running for a certain amount of time and has been arranged to include multiple Measurement Intervals, whereby Measurement Intervals 1-28 occur before the time 13:55 (i.e., 1:55 PM). At the end of each Measurement Interval, the PM data obtained during that time is reported to an NMS or other suitable device, as is shown. Measurement Intervals #29, #30, and #31 are shown in FIG. 4, where Measurement Interval #31 is truncated due to an interruption 52 at the time 14:22, seven minutes after the start of the Measurement Interval #31 at 14:15. The operating state, which may represent the state of an LM card, MRO card, DP card, XC card, etc., shows that the card is down. The operating state being down may be the result of the card starting a rebooting procedure or going down in order that it can be replaced by another card. In some embodiments, the operating state being down may be due to the start of a switchover procedure, such as a process where a Control Module (CM) is being switched over to another CM.

Also in FIG. 4, the times 14:25 and 14:35 pass by with the operating state being down, but the Measurement Interval #31 has already been cut short and these times are skipped. According to conventional functionality of the MEF 35.1 standard, Measurement Intervals are not resumed until after a recommencement event 54 is detected. The recommencement event 54 corresponds to the end of the interruption event 52 and is the time when the operating state of the affected component (e.g., LM card, MRO card, DP card, XC card, etc.) is up and running again or a new component configured to replace the affected component is up and running in a switchover procedure.

As can be seen in FIG. 4, the MEF 35.1 standard would normally restart the measuring of PM data at the point when the recommencement event 54 is detected, which is at 14:38 in this example. It may also be noted that this new Measurement Interval restarts at number 1 and continues from there. Measurement Intervals 1-4 in this example, which may be part of the same PM session or part of a new PM session, start at times 14:38, 14:48, 14:58, and 15:08, respectively, which does not continue the pattern before the interruption event 52. Also, the five-minute offset is no longer followed. The time-of-day clock shows the end times and start times of the sample of Measurement Intervals.

Figure 5:
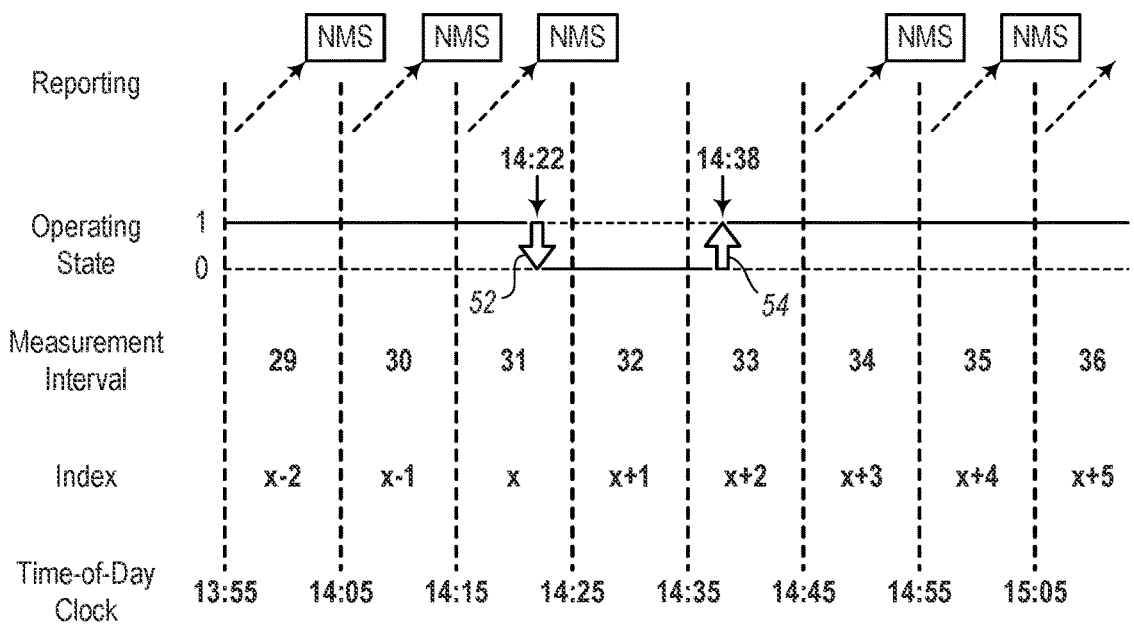
FIG. 5 is a chart illustrating the example of the effect of the interruption event on the Measurement Intervals during the MEF 35.1 PM session where actions are taken to provide continuous and consistent Measurement Intervals, according to various embodiments of the present disclosure.

FIG. 5 is a chart illustrating the example of the effect of the interruption event on the Measurement Intervals during the MEF 35.1 PM session. However, according to the embodiments of the present disclosure, additional actions are taken, beyond the regular MEF 35.1 standard to provide continuous and consistent Measurement Intervals.

To simplify the discussion, the same duration of 10 minutes and offset of 5 minutes are used, as well as the same original Measurement Intervals #29-#31 (where Measurement Intervals 1-28 proceeds what is shown in the drawings). Also, the same interruption event 52 and recommencement event 54 are the same as those of FIG. 4. However, instead of allowing the PM session to only restart, the PM session in FIG. 5 may continue in some cases or may be restarted as the PM session in other cases.

The embodiments of the present disclosure include determining a time when the recommencement event 54 takes place (i.e., at the time-of-day of 14:38) and calculate the time that has passed since the last-reported Measurement Interval. In this example, the last-reported Measurement Interval was Measurement Interval #30 since the truncated Measurement Interval #31 is not reported due to the occurrence of the interruption event 52 in Measurement Interval #31. For reference, the interruption can be indexed with the character "x" and the relative indexes of other Measurement Intervals are indicated in FIG. 5.

In this example, the elapsed time from the end of Measurement Interval #30 (i.e., the last-reported Measurement Interval), which occurs at 14:15, to the recommencement event 54, which occurs at 14:38, is 23 minutes. Also, a calculation can be made to determine the time of the next scheduled end time and start time of the next Measurement Interval. In this case, the next start time is at 14:45. The elapsed time value (i.e., 23 mins) is divided by the duration (i.e., 10 mins) to get 2.3. From this value, the whole number (2) is taken, it can be determined that there should be two Measurement Intervals (e.g., Measurement Intervals #31 and #32) that can be inserted after the last-reported Measurement Interval #30, where the first Measurement Interval #31 is a truncated interval and can be marked as "suspect." Also, another Measurement Interval #33 can be inserted, which is also a truncated interval due to the recommencement event 54 occurring in the middle. Thus, three additional Measurement Intervals #31-#33 are inserted in the data stored in the history database to maintain the consistency found before the interruption. These Measurement Intervals #31-#33 may be marked as suspect (e.g., by setting a "suspect flag" associated with each Measurement Interval). In this way, the Measurement Intervals after an interruption can be aligned with the Measurement Intervals before the interruption. This provides a record that is more consistent and does not create problems for the NMS 18 or other device that may use the PM data for determining aspects of the network domain 12.

A cold reboot may refer to a case where a DP card gets changed and the PM sessions (e.g., MEF 35.1 SOAM PM sessions) are moved to a new DP card. At this point, the PM session is started with an interval index that is incremented from the last completed interval. A warm reboot may refer to a case where a DP card does not change and the PM session gets terminated when the DP card goes down and restarted again (i.e., when the card comes up). In this case, the new interval index is selected as increment from the last completed interval. When a switchover or reboot occurs (or when both occur at same time) in chassis-based system, then the PM session (e.g., MEF 35.1 SOAM PM session) gets terminated and restarted again. In this case too, the new interval index is selected as incremented from last completed interval.

Thus, the present disclosure provides systems and methods that are configured to offer a solution in case where the DP card gets rebooted and PM sessions are configured on MRO cards. Switchover or reboot procedures may occur in the chassis-based system, and PM sessions are configured.

The Measurement Interval Inserting Routine 44 may allow a PM session to get restarted and may include logic for calculation of the Measurement Intervals (e.g., iterations) which were skipped or passed during the reboot or switchover procedures. The calculation may be based on the time of the last completed Measurement Interval end time. Measurement Intervals which were skipped/passed during that time will be added in history with the suspect flag enabled and the next Measurement Interval (e.g., index x+2 will be started based on the duration left for that interval (e.g., seven minutes). With this strategy, alignment will be followed, and correct Measurement Intervals and index numbers will be continued or restarted in alignment.

With the traditional MEF 35.1 operations, as shown in FIG. 4, the prior PM data is lost during an interruption and the Measurement Intervals are started from scratch at Measurement Interval #1. However, with the embodiments described herein, it is possible to maintain the sequence of Measurement Interval numbers after an interruption and keep the previously stored PM data. Also, the embodiments of the present disclosure allow a PM session to continue, that is, if it is set up this way.

The embodiments of the present disclosure are preferably applicable to multi-card chassis systems or NEs, where memory can be allocated dynamically and can maintain the PM data throughout an interruption. Nevertheless, it is anticipated that the embodiments of the present disclosure may also apply to network components referred to as "pizza boxes." If a pizza box includes persistent memory and when an LM card is rebooted, thereby restarting the service with respect to the pizza box, then the memory would normally be lost. However, in this case, the PM data may be stored in a memory device that would allow the data content to be read accordingly for recovery when there is an interruption that would normally affect the Measurement Intervals.

When a service is down between two end points (e.g., NEs 22, 24), everything normally starts from scratch. If a pizza box restarts, the service starts from the beginning as well. In the multi-card chassis case, if an LM restarts, the service may still remain up and running. The CM may run a service between the two end points, which will exchange Continuity Check Messages (CCMs) back and forth while the service is up. The CCMs may be used to detect the operational state to determine when there is an interruption and when the recommencement event 54 restores the service.

Figure 6:
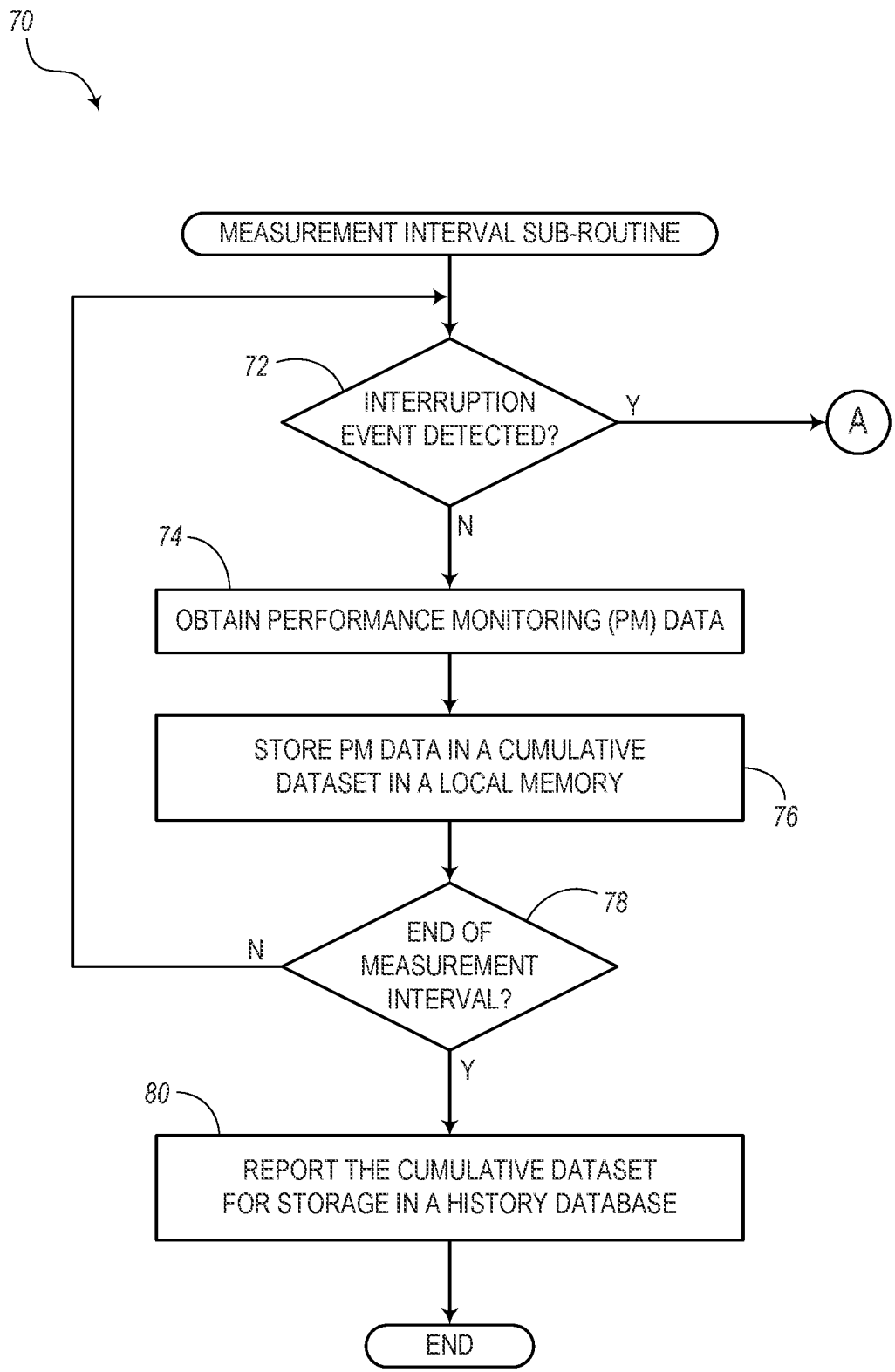
FIG. 6 is a flow diagram illustrating a process for measuring and reporting PM data with respect to a Measurement Interval, according to various embodiments.

FIG. 6 is a flow diagram illustrating an embodiment of a process 70 for measuring and reporting PM data with respect to a single Measurement Interval. For example, the process 70 may represent actions taken with respect to each Measurement Interval and may be referred to as a Measurement Interval sub-routine. In this embodiments, the process 70 includes the step of determining if an interruption event is detected, as indicated in condition diamond 72. If so, the process 70 is diverted to the process described with respect to FIG. 7 for handling the interruption. However, if there is no interruption, the normal processing includes obtaining Performance Monitoring (PM) data, as indicated in block 74. Next, the process 70 includes cumulatively storing the PM data in a cumulative dataset in local memory, as indicated in block 76.

The process 70 further includes determining whether the end of the Measurement Interval has been reached, as indicated in condition diamond 78. If the end has not been reached, the process 70 returns to the condition diamond 72 and repeats the interruption detection and PM data storing. Otherwise, if it is determined in condition diamond 78 that the end of the Measurement Interval is reached, the process proceeds to block 80, which includes the step of reporting the cumulative dataset of PM data for that Measurement Interval in order for the Measurement Interval (with the PM data) to be stored in a history database. After reporting, the process 70 (or sub-routine for this Measurement Interval) ends. The process 70 may then be repeated for the next Measurement Interval, and so on.

Figure 7:
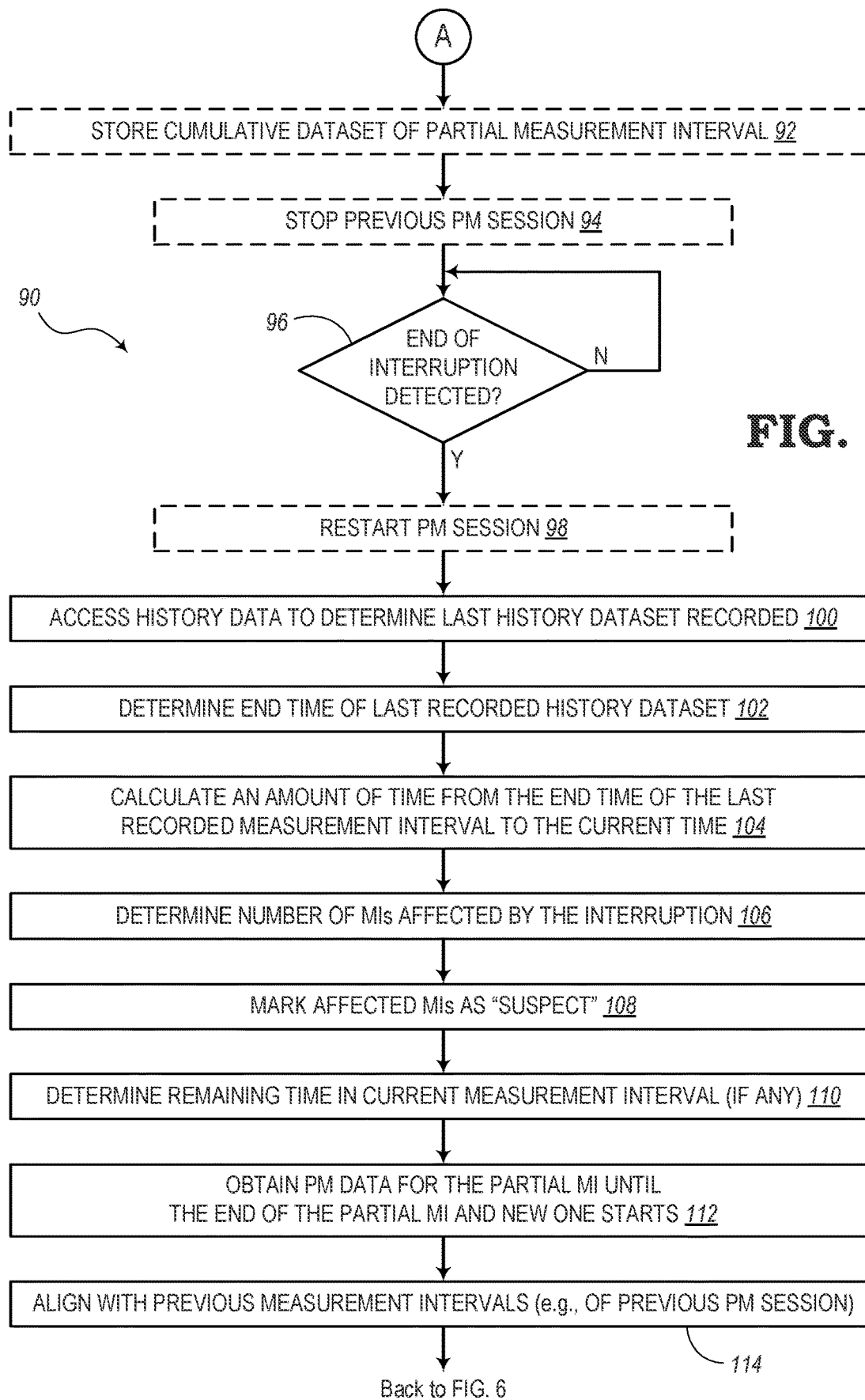
FIG. 7 is a flow diagram illustrating a process for handling an interruption event detected in the process of FIG. 6, according to various embodiments.

FIG. 7 is a flow diagram illustrating an embodiment of a process 90 for handling an interruption event, such as an interruption event detected in condition diamond 72 shown in the process 70 of FIG. 6. The process 90 of FIG. 7 includes the step of storing the cumulative dataset of the partial Measurement Interval into memory, as indicated in block 92. For example, this may include any PM data obtained during the Measurement Interval up until the point when the interruption is detected. In some embodiments, the step indicated by block 92 may be optional or may be omitted.

Furthermore, the process 90 includes the step of stopping the previous PM session, as indicated in block 94. Next, the process 90 includes determining if the end of the interruption is detected, as indicated in condition diamond 96. In other words, the process 90 may include determining if a recommencement event is detected. The process 90 further includes restarting the PM session, as indicated in block 98. According to some embodiments, blocks 94 and 98 may be optional or may be omitted if the PM session is configured to continue through the interruption.

Also, the process 90 includes the step of accessing the history data (stored in the history database) to determine the last history dataset recorded, as indicated in block 100. The process 90 also includes the step of determining the end time of the last-recorded history dataset, as indicated in block 102. Next, as shown in block 104, the process 90 includes calculating an amount of time from the end time of the last recorded Measurement Interval to the current time (when the interruption event ends or the recommencement event is detected).

After this amount of time is calculated, the process 90 includes determining a number of Measurement Intervals (MIs) affected by the interruption, as indicated in block 106. For example, this may include dividing the elapsed time (calculated in block 106) by the duration of each Measurement Interval (e.g., 23 minutes divided by 10 minutes (23/10) according to the example of FIG. 5) and dropping any remainder to get the whole number 2. In some embodiments, the quotient may be rounded up to the nearest whole number 3 to determine that three MIs were affected by the interruption. These MIs may then by marked as "suspect," as indicated in block 108, such as be setting a suspect flag.

Next, the process 90 includes determining a remaining amount of time in the current Measurement Interval, if any, as indicated in block 110. For example, in the case described with respect to FIG. 5, the remaining time may be calculated by subtraction, where 14:45-14:38=7 minutes (from the recommencement event 54 to the end of Measurement Interval #33). The process 90 may further include the step of obtaining PM data for the partial MI (Measurement Interval #33) until the end of the partial MI and the start of a new MI, as indicated in block 112. Also, the process 90 includes aligning the new Measurement Intervals with the previous Measurement Intervals, which may be part of the previous PM session (assuming the steps indicated by blocks 94 and 98 are performed). With the Measurement Intervals maintain consistently, the process 90 may then lead back to process 70 of FIG. 6 for performing the regular Measurement Interval sub-routine for subsequent MIs.

Figure 8:
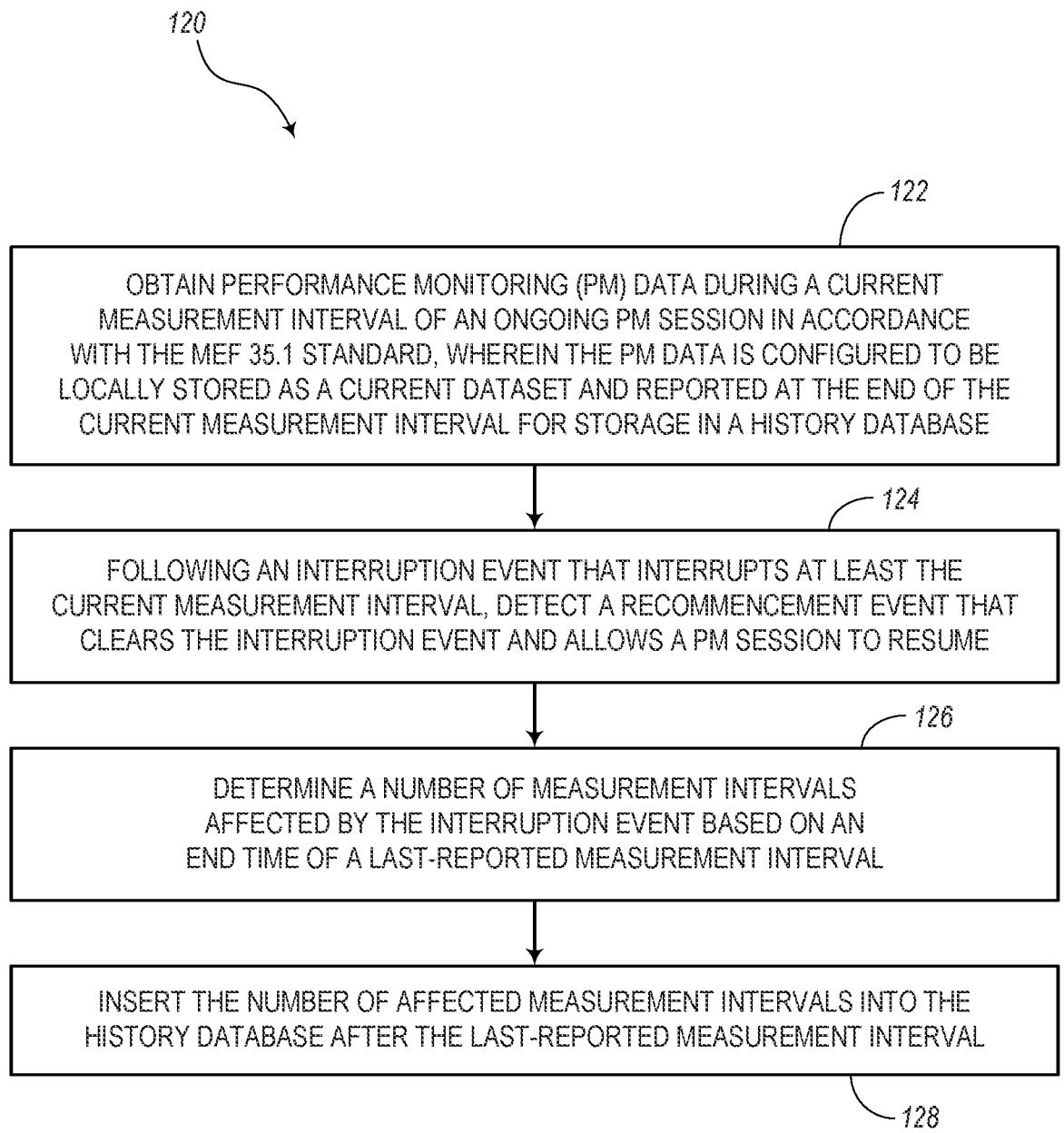
FIG. 8 is a flow diagram illustrating a process for inserting a number of Measurement Intervals within a history database to maintain continuous and consistent records in the history database, according to various embodiments.

FIG. 8 is a flow diagram illustrating an embodiment of another process 120 for inserting a number of Measurement Intervals within a history database to maintain continuous and consistent records in the history database. The process 120 includes the step of obtaining PM data during a current Measurement Interval of an ongoing PM session in accordance with the MEF 35.1 standard, as indicated in block 122. The PM data, for example, is configured to be locally stored as a current dataset to be reported at the end of the current Measurement Interval and stored in a history database. Following an interruption event that interrupts at least the current Measurement Interval, the process 120 includes the step of detecting a recommencement event that clears the interruption event and allows a PM session to resume, as indicated in block 124. Also, the process 120 includes the step of determining a number of Measurement Intervals affected by the interruption event based on an end time of a last-reported Measurement Interval, as indicated in block

126. Furthermore, the process 120 includes the step of inserting the number of affected Measurement Intervals into the history database after the last-reported Measurement Interval, as indicated in block 128.

According to various embodiments, the process 120 may be performed by the NMS 16, which may be configured to use the history database 18, or may be performed by one of the NEs 22, 24 or monitoring device 30, which may be configured to use the database 40 as the history database. In some embodiments, the process 120 may be configured as software and/or firmware and may be stored in a non-transitory computer-readable medium, such as memory device 34. When implemented in software and/or firmware, the process 120 may include logic or computer instructions enabling the processing device 32 to perform the steps described above.

In some additional embodiments, the process 120 may include aligning the start of a next whole Measurement Interval of the ongoing PM session with the end of the last affected Measurement Interval inserted into the history database. The step of inserting the number of affected Measurement Intervals into the history database (block 128) may be configured to provide continuous and consistent Measurement Intervals in the history database to thereby maintain the same duration and offset applied to Measurement Intervals before the interruption event. Each of the Measurement Intervals described in process 120 may include PM data obtained during a predetermined time period, wherein an end time of one Measurement Interval aligns with a start time of a subsequent Measurement Interval to eliminate gaps in the history database.

The step of inserting the number of affected Measurement Intervals into the history database (block 128) may be performed in lieu of resetting the PM session, according to some embodiments. The process 120 may further include the step of setting a suspect flag associated with each of the inserted Measurement Intervals. The interruption event and recommencement event, for example, may be associated with a) a reboot procedure of a Line Module (LM) card, b) a reboot procedure of a Multi-Rate Optical (MRO) card, c) a reboot procedure of a Data Primary (DP) card, d) a reboot procedure of a Cross Connect (XC) card, or e) a switchover procedure from one control module to another. Each of the reboot procedures may be either a cold reboot, in which the corresponding card is replaced with another similar card, or a warm reboot, in which the interruption event is related to the corresponding card operationally going down and the recommencement event is related to the corresponding card operationally coming back up again.

In some cases, the PM data may be obtained between a pair of NEs arranged in a network domain. The NE may be a chassis-based Maintenance-association End Point (MEP) at an edge of the network domain or a Network Management System that monitors one or more chassis-based MEPs at the edge of the network domain. The PM data may be related to Connectivity Fault Management (CFM) data. The process 120 may further include the step of applying an index number to each of the inserted Measurement Intervals to continue a sequence of index numbers from the last-reported Measurement Interval.

The present disclosure is directed to systems and methods focusing on an unaddressed issue in MEF 35.1 regarding Service Operations, Administration, and Maintenance (SOAM) functionality, such as Performance Monitoring (PM) data collection and handling. Conventionally, the MEF 35.1 standard does not anticipate how Measurement Intervals are affected during an interruption. Thus, the systems and methods described in the present disclosure are configured to insert Measurement Intervals at the end of a last-reported Measurement Interval to fill in any gaps that might otherwise be formed and to align the inserted Measurement Intervals with the end of the last-reported Measurement Interval. These processes also correct any index information with respect to Measurement Intervals when a reboot (restart) or switchover interrupts normal operations of a chassis-based network element. By aligning the Measurement Intervals for consistency throughout one or more PM sessions with index information calculated corrected, the history data can be accessed and presented properly.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A Network Element (NE) comprising:
a processing device, and
a memory device configured to store a computer program having instructions that, when executed, enable the processing device to
obtain Performance Monitoring (PM) data during a current Measurement Interval of an ongoing PM session in accordance with the Metro Ethernet Forum (MEF) 35.1 standard, wherein the PM data is configured to be locally stored as a current dataset to be reported at the end of the current Measurement Interval for storage in a history database,
following an interruption event that interrupts at least the current Measurement Interval, detect a recommencement event that clears the interruption event and allows a PM session to resume,
determine a number of Measurement Intervals affected by the interruption event based on an end time of a last-reported Measurement Interval, and
insert the number of affected Measurement Intervals into the history database after the last-reported Measurement Interval,
wherein each of the Measurement Intervals includes PM data obtained during a predetermined time period, and wherein an end time of one of a Measurement Interval aligns with a start time of a subsequent Measurement Interval to eliminate gaps in the history database, wherein inserting the number of affected Measurement Intervals into the history database is performed in lieu of resetting the PM session, and wherein the instructions further enable the processing device to set a suspect flag associated with each of the affected Measurement Intervals.

2. The NE of claim 1, wherein the instructions further enable the processing device to align the start of a next whole Measurement Interval of the PM session with the end of the last affected Measurement Interval inserted into the history database.

3. The NE of claim 1, wherein the interruption event and recommencement event are associated with one or more of a reboot procedure of a Line Module (LM) card, a reboot procedure of a Multi-Rate Optical (MRO) card, a reboot procedure of a Data Primary (DP) card, a reboot procedure of a Cross Connect (XC) card, and a switchover procedure from one control module to another.

4. The NE of claim 3, wherein each of the reboot procedures is one of a) a cold reboot in which a corresponding card is replaced with another similar card or b) a warm reboot in which the interruption event is related to the corresponding card operationally going down and the recommencement event is related to the corresponding card operationally coming back up again.

5. The NE of claim 1, wherein the PM data is obtained between a pair of NEs arranged in a network domain.

6. The NE of claim 5, wherein the NE is one of a chassis-based Maintenance-association End Point (MEP) at an edge of the network domain or a Network Management System that monitors one or more chassis-based MEPs at the edge of the network domain.

7. The NE of claim 1, wherein the PM data is related to Connectivity Fault Management (CFM) data.

8. The NE of claim 1, wherein the instructions further enable the processing device to apply an index number to each of the affected Measurement Intervals to continue a sequence of index numbers from the last-reported Measurement Interval.

9. A non-transitory computer-readable medium configured to store computer logic having instructions that, when executed, cause one or more processing devices to:
obtain Performance Monitoring (PM) data during a current Measurement Interval of an ongoing PM session in accordance with the Metro Ethernet Forum (MEF) 35.1 standard, wherein the PM data is configured to be locally stored as a current dataset to be reported at the end of the current Measurement Interval for storage in a history database,
following an interruption event that interrupts at least the current Measurement Interval, detect a recommencement event that clears the interruption event and allows a PM session to resume,
determine a number of Measurement Intervals affected by the interruption event based on an end time of a last-reported Measurement Interval, and
insert the number of affected Measurement Intervals into the history database after the last-reported Measurement Interval,
wherein each of the Measurement Intervals includes PM data obtained during a predetermined time period, and wherein an end time of one of a particular Measurement Interval aligns with a start time of a subsequent Measurement Interval to eliminate gaps in the history database, and wherein the instructions further cause the one or more processing devices to set a suspect flag associated with each of the affected Measurement Intervals.

10. The non-transitory computer-readable medium of claim 9, wherein the instructions further cause the one or more processing devices to align the start of a next whole Measurement Interval of the PM session with the end of the last affected Measurement Interval inserted into the history database.

11. The non-transitory computer-readable medium of claim 9, wherein the interruption event and recommencement event are associated with one or more of a reboot procedure of a Line Module (LM) card, a reboot procedure of a Multi-Rate Optical (MRO) card, a reboot procedure of a Data Primary (DP) card, a reboot procedure of a Cross Connect (XC) card, and a switchover procedure from one control module to another, and wherein each of the reboot procedures is one of a) a cold reboot in which a corresponding card is replaced with another similar card or b) a warm reboot in which the interruption event is related to the corresponding card operationally going down and the recommencement event is related to the corresponding card operationally coming back up again.

12. A method comprising the steps of:
obtaining Performance Monitoring (PM) data during a current Measurement Interval of an ongoing PM session in accordance with the Metro Ethernet Forum (MEF) 35.1 standard, wherein the PM data is configured to be locally stored as a current dataset to be reported at the end of the current Measurement Interval for storage in a history database;
following an interruption event that interrupts at least the current Measurement Interval, detecting a recommencement event that clears the interruption event and allows a PM session to resume;
determining a number of Measurement Intervals affected by the interruption event based on an end time of a last-reported Measurement Interval, and
inserting the number of affected Measurement Intervals into the history database after the last-reported Measurement Interval,
wherein each of the Measurement Intervals includes PM data obtained during a predetermined time period, wherein an end time of one of a particular Measurement Interval aligns with a start time of a subsequent Measurement Interval to eliminate gaps in the history database, and wherein the step of inserting the number of affected Measurement Intervals into the history database is performed in lieu of resetting the PM session, further comprising the step of setting a suspect flag associated with each of the affected Measurement Intervals.

13. The method of claim 12, further comprising the step of aligning the start of a next whole Measurement Interval of the PM session with the end of the last affected Measurement Interval inserted into the history database.

14. The method of claim 12, wherein the PM data is obtained between a pair of chassis-based Maintenance-association End Point (MEP) devices at an edge of the network domain, and wherein the PM data is related to Connectivity Fault Management (CFM) data.

* * * * *